Dec. 16, 1952      F. TODD      2,621,887
RETAINER FOR PLUG VALVE BARRELS
Filed May 19, 1949
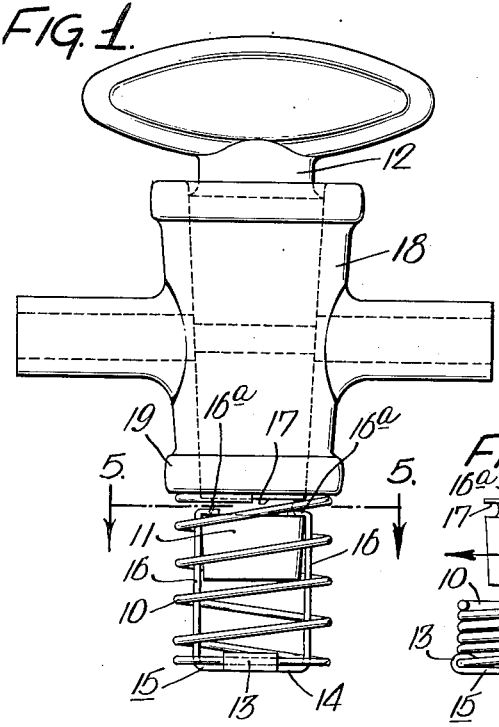
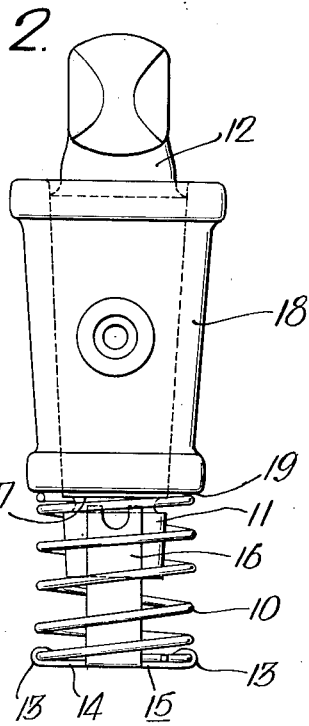
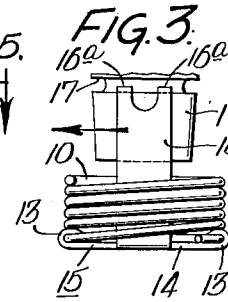
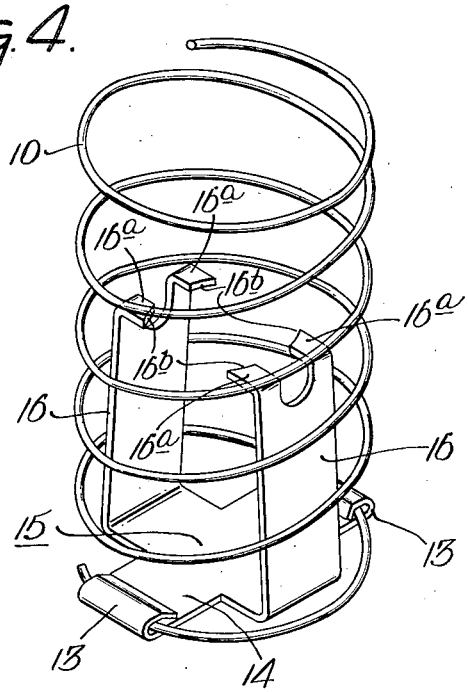
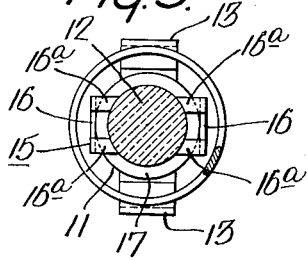
Inventor:
Floyd Todd
by his Attorneys
Howson & Howson

UNITED STATES PATENT OFFICE 2,621,887

RETAINER FOR PLUG VALVE BARRELS

Floyd Todd, Springfield, Pa.

Application May 19, 1949, Serial No. 94,200

1 Claim. (Cl. 251—112)

This invention relates to plug valves and more particularly to an improved retainer especially adapted for use on glass stopcocks.

The conventional plug retainer for glass stopcocks comprises a rubber ring or washer adapted to fit in an annular groove in the plug or barrel of the stopcock after insertion. This retainer has been notoriously unsatisfactory for several reasons. In the first place, the rubber washers deteriorate after they are in service for relatively short periods of time. Naturally, the rate of deterioration is dependent somewhat upon the chemicals or liquids flowing in the line in which the stopcock is installed. An additional disadvantage resides in the fact that the rubber ring does not exert any axial tension on the barrel so that the stopcock soon leaks and cannot be made to have an effective air or liquid-tight seal.

Various other expedients have been tried to eliminate the disadvantages of the rubber ring noted above. One form of such a retainer employs a split screw which is adapted to fit over the end of the barrel. A sleeve is then applied over the split screw and a spring operates between the end of the sleeve and a pair of nuts that are threaded on the screw to provide the desired tension in the barrel. This assembly has six parts, four of which are threaded, and is not only expensive but difficult to install and to remove. Such devices require machine operations in their manufacture and the small parts comprising the retainer assembly are likely to be lost or dropped when the stopcock is disassembled for lubrication or cleaning.

A primary object of the invention therefore, is to provide a simple barrel retainer for a plug valve that is inexpensive to manufacture and that may be readily installed and removed from the valve barrel.

A further object of the invention is to provide a threadless plug valve barrel retainer which may be used on glass stopcocks.

A still further object of the invention is to provide a plug valve barrel retainer having a minimum number of parts, and which when removed from the barrel comprises a unitary assembly.

A further object of the invention is to provide an adjustable tension retainer for plug valve barrels which eliminates the necessity for threads.

Further objects will be apparent from the specification and drawings in which:

Fig. 1 is a side elevation of a stopcock with my retainer assembled thereon;

Fig. 2 is a side elevation of the structure of Fig. 1;

Fig. 3 is a fragmentary view showing the retainer spring compressed to illustrate the manner in which the retainer is removed from the valve barrel;

Fig. 4 is a perspective on an enlarged scale, showing the retainer assembly; and Fig. 5 is a transverse section as seen at 5—5 of Fig. 1.

Referring now more particularly to the drawings, the preferred form of my plug valve retainer assembly comprises a helical spring 10 having a diameter somewhat larger than the outside diameter of the protruding end 11 of plug valve barrel 12. Spring 10 at its opposite end is fastened to turned ears 13, 13 which form the termini of cross member 14 of the retaining clip 15. Arms 16, 16 extend at right angles to the cross member 14 and in the assembled positions of Figs. 1 and 2, are generally parallel to the axis of spring 10 and are enclosed within the helixes of the spring. The ends of arms 16, 16 are turned inwardly to provide teeth 16a, 16a having arcuate edges 16b, 16b that engage an annular groove 17 on barrel end 11. Clip 15 may, if desired, be of mildly resilient metallic construction so that the arms 16, 16 when disconnected from the barrel, bend inwardly toward each other (as shown in Fig. 4).

To install my retainer, it is only necessary to compress spring 10 downwardly against the ears 13, 13 as shown in Fig. 3, whereupon arms 16, 16 and teeth 16a, 16a can be inserted transversely over barrel end 11 and into groove 17 respectively. Spring 10 is then released and provides whatever tension may be required to insure a tight seal between the tapered barrel 12 and the valve body 18. Adjustment of the sealing tension is readily achieved by varying the pressure with which spring 10 bears against the annular edge 19 of valve body 18. Manual extension of the spring when disassembled, or the provision of a heavier or lighter spring, readily effects this object.

It will thus be understood that I have provided an extremely inexpensive, simple and efficient barrel retainer which requires no threaded connection with the valve body or barrel and is therefore particularly suitable on glass stopcocks. When installed, the coils of spring 10 positively prevent accidental removal of the retainer since clips 16, 16 cannot be disengaged from groove 17 unless the spring is compressed.

While I have illustrated my improved retainer in conjunction with a glass stopcock, it will be understood that such a retainer can be employed on metallic valves as well.

Having thus described my invention, I claim:

A barrel retainer for plug valves comprising a helical compression spring, a pair of arms axially disposed within said spring, a plurality of teeth on one end of each of said arms, a cross member formed integrally with the other ends of said arms, and a pair of abutments on said cross member adapted to engage one end of said spring, the diameter of the spring and the resiliency of the arms with respect to each other being such that the arms in a parallel position are closely confined within the bore of said spring.

FLOYD TODD.

REFERENCES CITED

The following references are of record in the file of this patent:

UNITED STATES PATENTS

| Number | Name | Date |
|---|---|---|
| 73,609 | Jones | Jan. 21, 1868 |
| 1,298,061 | Kruse | Mar. 25, 1919 |
| 1,357,608 | Blackmore | Nov. 2, 1920 |
| 1,448,221 | Johnson | Mar. 13, 1923 |
| 1,588,471 | Bezkorowajnyj | June 15, 1926 |
| 2,162,045 | Winkler | June 13, 1939 |